United States Patent [19]

Camilleri et al.

[11] 3,969,664

[45] July 13, 1976

[54] MONITOR SYSTEMS

[75] Inventors: Michael Camilleri, Chatham;
Michael Terence Usher, Bedford;
Mark Beresford Wilson,
Houghton-le-Spring, all of England

[73] Assignee: The British Petroleum Company Limited, London, England

[22] Filed: Oct. 4, 1974

[21] Appl. No.: 512,170

[30] Foreign Application Priority Data

Oct. 18, 1973   United Kingdom............... 48604/73

[52] U.S. Cl............................. 318/565; 340/213 Q
[51] Int. Cl.²......................................... G05B 23/02
[58] Field of Search............... 318/565; 340/213 Q, 340/267 R, 233, 30; 307/207

[56] References Cited
UNITED STATES PATENTS

| | | | |
|---|---|---|---|
| 3,135,485 | 6/1964 | Miller | 318/565 X |
| 3,145,330 | 8/1964 | Hecht | 318/565 X |
| 3,252,675 | 5/1966 | Close et al. | 318/565 X |
| 3,408,024 | 10/1968 | Iverson | 318/565 X |
| 3,462,662 | 8/1969 | Carpenter | 318/565 |
| 3,463,979 | 8/1969 | Scobie et al. | 318/565 |
| 3,551,776 | 12/1970 | Tawfik et al. | 318/565 X |
| 3,634,746 | 1/1972 | Strege, Sr. | 318/565 |
| 3,794,267 | 2/1974 | Maltby et al. | 318/565 X |
| 3,821,623 | 6/1974 | Inuiya | 318/565 X |

*Primary Examiner*—Gene Z. Rubinson
*Assistant Examiner*—John J. Feldhaus
*Attorney, Agent, or Firm*—Morgan, Finnegan, Pine, Foley & Lee

[57] ABSTRACT

Monitor apparatus for monitoring the operation of remote control apparatus for linear or rotary actuators. Signals are derived representative of input commands to the control apparatus, of servo directional output control signals from the control apparatus and representative of actuator response. Logic circuits are provided to effectively compare these signals and give an indication of any error. The arrangement may be such that the monitor apparatus is functioning in a monitoring capacity even when no input commands are given to the control apparatus. Preferably the monitor apparatus is separate from the control apparatus.

17 Claims, 2 Drawing Figures

MONITOR SYSTEMS

The invention relates to monitoring systems for monitoring the operation of remote positional control of linear or rotary actuators.

It is known from German Pat. No. 1763001 and French Pat. No. 2,121,617 to provide a remote control system which includes an integral monitoring arrangement to compare control apparatus outputs with actuator response. However, these monitoring arrangements do not include comparision of the directional input commands to the control apparatus.

According to one aspect of the invention there is provided a monitor apparatus arranged to be capable of monitoring the operation of remote control apparatus for linear or rotary actuators which comprises means arranged to derive respective inputs representative of directional input commands to the control apparatus and representative of servo directional control signals from the control apparatus, means arranged to derive inputs representative of actuator response and logic circuit means arranged to utilise the inputs to produce an output upon the detection of an error of the control apparatus or actuator.

According to a further aspect of the invention there is provided a monitor apparatus arranged to be capable of monitoring the operation of remote control apparatus for linear or rotary actuators comprising means arranged to derive respective inputs representative of directional input commands to the control apparatus to actuate logic circuit means to produce a first signal, means arranged to derive respective inputs representative of servo directional output control signals from the control apparatus to comprise or produce a second signal, means arranged to derive respective inputs representative of actuator response to comprise or produce a third signal, and further logic means arranged effectively to compare the second and third signals with the first signal and produce an output upon the detection of an error of said comparison.

Inputs to the monitor apparatus representative of directional input commands may be delayed before use in the monitor apparatus and may be used only if of a predetermined duration. Means may be provided to detect inputs representative of directional input commands which exceed a further predetermined duration.

The logic circuit means may include means for producing an error signal if the control apparatus produces servo directional control signals in opposed directions.

Means may be arranged to produce further inputs representative of no directional input commands to the control apparatus, representative of no servo directional control signals from the control apparatus and representative of no actuator response, said further inputs being arranged to be fed to the logic circuit means so as positively to monitor at all times when in use, even when no directional commands are being given.

Preferably the monitor apparatus is separate from the control apparatus and is electrically isolated therefrom.

The foregoing and further features of the invention may be more readily understood from the following description of two preferred embodiments thereof, by way of example, with reference to the accompanying drawings, in which.

The apparatus illustrated will be described for use in monitoring operation of remote control apparatus for a bow thruster as used on tank vessels. However, as will be explained more fully hereinafter, the apparatus is not limited to such use.

Figure 1:
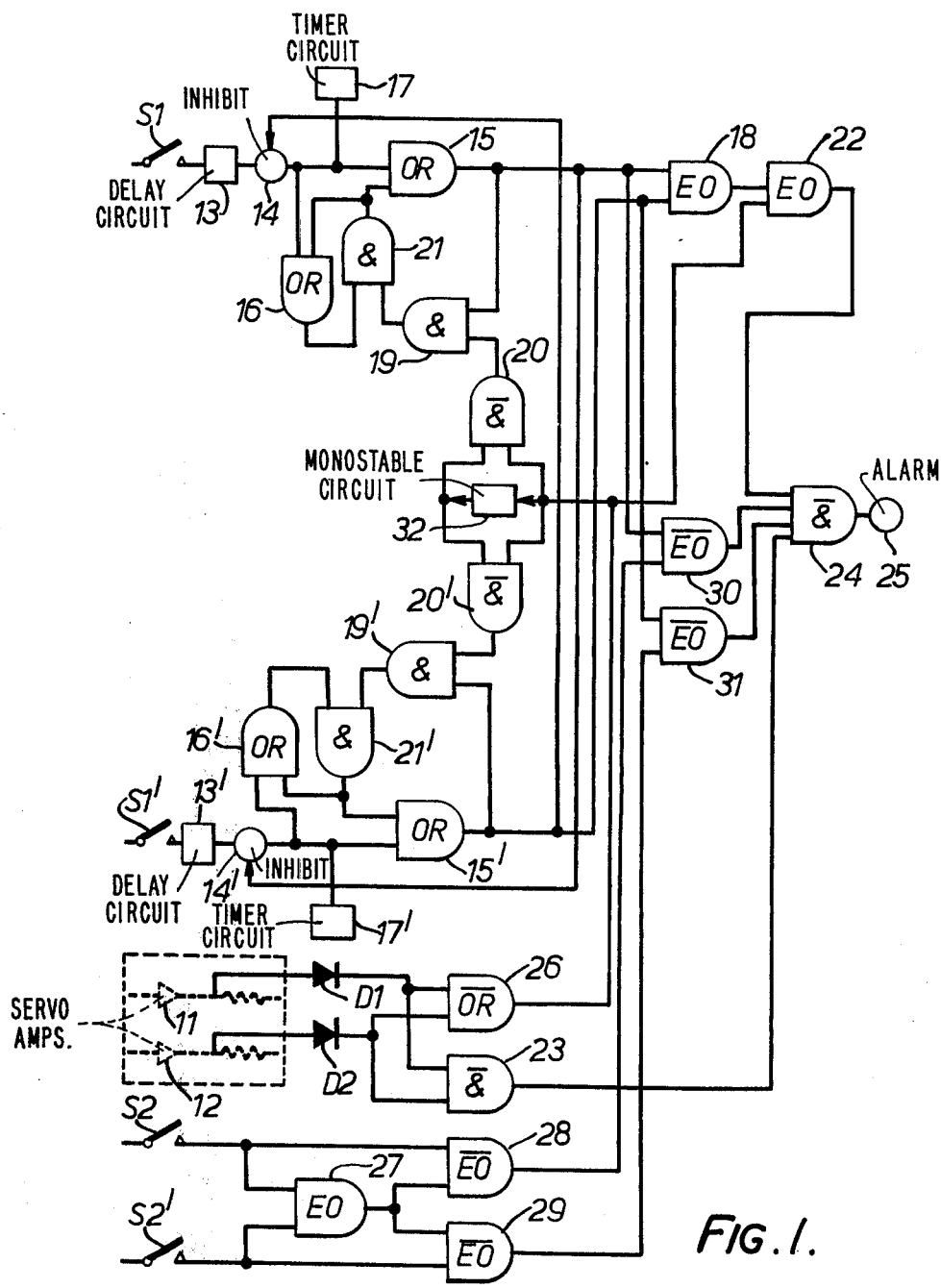
FIG. 1 is a logic circuit diagram of a monitor apparatus.

Referring now to FIG. 1 of the drawings the actuator control apparatus comprises a manually operable potentiometer (not shown) for setting required movement of the actuator. Microswitches S1 and S1' are provided on the potentiometer and are closed when the potentiometer is moved for required starboard or port actuation respectively. The control apparatus further includes servo amplifiers 11 and 12 which produce directional control signal outputs for starboard or port actuation respectively. The bow thruster actuator comprises a hydraulic ram (not shown) with a bypass valve and pressure responsive switches S2 and S2' are positioned to be closed upon actuation to starboard or port respectively of the ram.

Operation of the apparatus will now be described for a required actuation of the bow thruster to starboard. Initially, the potentiometer is moved and causes closing of microswitch S1 so providing an input to a delay circuit 13. The delay circuit 13 produces an output only if the switch S1 is actuated for a predetermined time to prevent accidental operation from producing an alarm and to give time for the control system and actuator to respond to the command. An ouput from circuit 13 passes through an INHIBIT gate 14 and is fed as one input to OR gates 15 and 16 and to a timer circuit 17 which provides an alarm signal if the switch S1 is closed for more than a predetermined time.

The output from OR gate 15 is fed as one input to an EXCLUSIVE OR gate 18, as one input to an AND gate 19 and as the input to INHIBIT gate 14' of the "port" logic. The AND gate 19 receives a further input from the output of a NAND gate 20 which at this time has zero inputs and therefore is producing an output. The output from AND gate 19 is fed as one input to an AND gate 21 which derives a further input from OR gate 16. Since OR gate 16 has an input thereto an output is produced therefrom and hence an output is produced from AND gate 21. The output from AND gate 21 is fed as a further input to OR gates 15 and 16 and hence the logic arrangement is self-sustaining until reset as hereinafter described.

A similar logic circuit is provided for the switch S1' and is referenced as for switch S1 but shown with slashes after corresponding reference numerals.

Assuming the logic for the switch S1' is operating correctly there is a zero output from OR gate 15' to EXCLUSIVE OR gate 18 and hence gate 18 produces an output which is fed as one input to an EXCLUSIVE OR gate 22.

Outputs from servo amplifiers 11 and 12 are connected via respective isolating diodes D1 and D2 as inputs to a NAND gate 23. Assuming there is an output from amplifier 11 and no output from amplifier 12 (correct operation) NAND gate 23 produces an output which is fed to a NAND gate 24. Such input to NAND gate 24 does not produce an output therefrom. Should there be outputs from both amplifiers 11 and 12 a zero output would be produced from NAND gate 23 and an output from NAND gate 24 would be fed to a delayed alarm 25.

The outputs from amplifiers 11 and 12 are also fed as inputs to a NOR gate 26 and with correct operation of amplifiers 11 and 12 a zero output would occur at NOR gate 26 which is connected as a further input to EXCLUSIVE OR gate 22. Since an input is being fed thereto from gate 18 an output is fed to NAND gate 24 to maintain zero output therefrom. Clearly an output from gate 26 would produce a zero output from gate 22 and hence an output from gate 24 to alarm 25.

With correct response of the ram, switch S2 will be closed and switch S2' open. Hence an input is fed to an EXCLUSIVE OR gate 27 from switch S2 and zero input from switch S2'. Hence an output is fed from gate 27 to one input each of two NOT EXCLUSIVE OR gates 28 and 29 to which the outputs from switches S2 and S2' are respectively fed as further inputs. Hence an output is fed from gate 28 as one input to a NOT EXCLUSIVE OR gate 30, the other input to which is derived from the output of OR gate 15. Hence an output is produced from gate 30 which is fed to NAND gate 24 to maintain zero output therefrom. Similarly the zero output from gate 29 is fed as one input to a NOT EXCLUSIVE OR gate 31, the other input of which is derived from the present zero output of OR gate 15'. Hence an output is produced from gate 31 which is fed as a further input to NAND gate 24 to maintain its output zero.

Upon the actuator reaching the required position the outputs from both amplifiers 11 and 12 will revert to zero and an output will be produced from NOR gate 26. This output is fed as one input of each of the two NAND gates 20 and 20' and fed to actuate a monostable circuit 32. The output from circuit 32 is fed as the other inputs to NAND gates 20 and 20' and therefore the outputs therefrom become zero. This in turn ensures the outputs of AND gates 19 and 21 are zero and hence resets the logic for switches S1 and S1'.

The operation of the monitor for a "port" command is identical to that described above except that the roles of the logic circuitry for switches S1 abd S1' are reversed, the outputs from gates 28 and 29 are reversed and the inputs to gates 30 and 31 are reversed.

The alarm 25 is delayed since mechanical parts are involved in the system, so that spurious alarms are not produced. In practice the ram of the actuator oscillates a small amount and a logic lamp may be connected to the output of NAND gate 24 to show that the correct oscillation is taking place. Alarm 25 could be supplemented with means for disconnecting the control circuit and for shut down if required.

The delay circuits 13 and 13' could be omitted and replaced by mechanical, i.e. lost motion, delays of actuation of switches S1 and S1'. The inputs to INHIBIT gates 14 and 14' could alternatively be derived from the outputs from AND gates 19' and 19 respectively.

Figure 2:
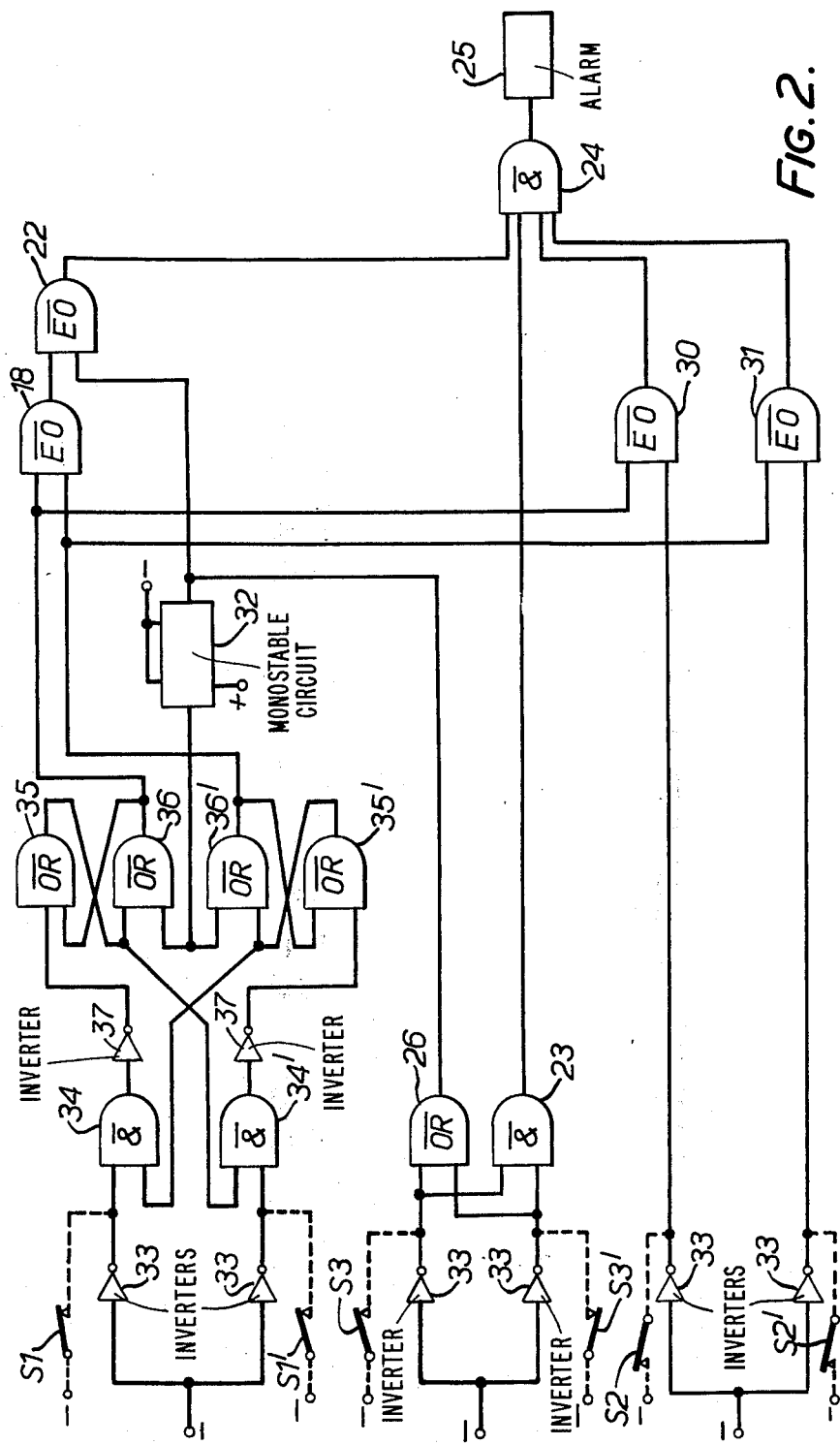
FIG. 2 is a logic circuit diagram of an alternative monitor apparatus.

Referring now to FIG. 2 there is shown a monitoring system similar to FIG. 1, but somewhat simplified and like parts have been given the same references as those used in FIG. 1.

There are two major differences in the FIG. 2 system and the first is that at each of the signal input points to a system a negative signal is applied via normally closed switches S1, S1', S2, S2' and S3, S3' to provide a negative input representative of no external input. With such an arrangement the system is effectively monitoring operation of all times, when in use, even when no actuator movement is commanded. The actuator inputs to the system override these negative inputs when the actuator control system comes into operation.

The second major difference is in the logic circuitry associated with the switches S1 and S1' as will become apparent from the following description.

In the quiescent condition with no actuator movement commanded a negative input via switch S1 provides a zero input to an input of a NAND gate 34. The other input to NAND gate 34 is a one input from the output of a NOR gate 35' and therefor the output from NAND gate 34 is a one output. Such output is inverted by an inverter 37 and hence a zero input is applied to one input of a NOR gate 35. The other input to NOR gate 35, derived from the output of a NOR gate 36 is also a zero and hence the output of NOR gate 35 is a one which is fed as one input to the NOR gate 36. The other input to NOR gate 36, derived from monostable circuit 32 is a zero and hence the output from NOR gate 36 is a zero which is fed to one input of NOT EXCLUSIVE OR gate 18 as well as to one input of NOR gate 35.

In similar fashion a negative input via switch S1' produces a zero outut from NOR gate 36' which is fed to NOT EXCLUSIVE OR gate 18 as well as NOR gate 35'. Hence zero inputs are applied to both the inputs of NOT EXCLUSIVE OR gate 18 as well as to one input each of NOT EXCLUSIVE OR gates 30 and 31.

Zero inputs to gates 23 and 26 via normally closed switches S3 and S3' ensure one outputs therefrom. The one output from gate 26 is fed to NOT EXCLUSIVE OR gate 22 as is the one ouput from gate 18 and hence a one output is fed from gate 22 to NAND gate 24. The one output from gate 23 is directly fed to a further input of NAND gate 24.

Zero inputs via normally closed switches S2 and S2' are fed to NOT EXCLUSIVE OR gates 30 and 31 to produce one outputs therefrom which are fed as inputs to NAND gate 24.

From the above it will be seen that if any one of switches S1, S1', S2, S2', S3 or S3' is opened alone due to any fault in the apparatus monitored, a negative signal will pass via the respective inverter 33 to provide a positive or one input to the monitor system and hence actuate the alarm 25.

With correct actuation of the control system being monitored for a movement to starboard switches S1, S2 and S3 will all open within the time delay provided in alarm 25.

The input to NAND gate 34 will change to a one via inverter 33 and hence its output will change to zero. This output is inverted and fed as a one to gate 35 which has its output changed to zero and fed to gates 36 and 34'. Hence the output from gate 36 changes to a one which is fed to gate 18. The output from gate 18 changes to a zero which is fed to gate 22. However, since switch S3 has opened one input to NOR gate 26 has changed to a one from inverter 33. This changes the output of gate 26 to a zero and hence two zero inputs are fed to gate 22. Hence the output of gate 22 remains as a one and the alarm is not actuated. Similarly the inputs to gate 30 from switch S2 and gate 36 both change from zero to a one and hence the output therefrom remains a one. Should any one of switches S1, S2 or S3 remain closed or any one of switches S1', S2' or S3' open then the alarm would be actuated.

Actuation of the control system for a port command is similar to that described above except that switches S1', S2', and S3' are opened and switches S1, S2 and S3 remain closed.

Although both embodiments have been described for use with remote control apparatus for a hydraulic actuator, the monitors could be used with control apparatus for pneumatic or electrical actuators, both linear and rotary.

The apparatus illustrated is particularly for use in monitoring control apparatus which does not include such monitoring or to supplement existing monitoring. The monitor is provided as a separate unit and is completely isolated from the control apparatus.

We claim:

1. A monitor apparatus arranged for monitoring the operation of remote control apparatus for actuators, which monitor apparatus is separate and electrically isolated from the remote control apparatus, comprising:

first means for providing respective inputs representative of directional input commands to the control apparatus;

first logic means electrically connected to and actuable by said first means for producing a signal;

second means for providing respective inputs representative of servo directional output control signals from the control apparatus;

second logic means for comparing the respective inputs from said second input providing means with the signal from said first logic means to provide an error signal upon the detection of an error between the respective inputs from said second input providing means and the signal from said first logic means;

third means for providing respective inputs representative of actuator response;

third logic means for comparing the respective inputs from said third input providing means with the signal from said first logic means to provide an error signal upon the detection of an error in the respective inputs from said third input providing means and the signal from said first logic means; and fourth logic means for receiving signals from said second and third logic means to provide an output signal if either of the signals from said second and third logic means is an error signal.

2. A monitor apparatus as claimed in claim 1 including means arranged to delay the inputs representative of directional input commands and to allow such inputs to be utilised only if of a predetermined duration.

3. A monitor apparatus as claimed in claim 2 including means arranged to detect inputs representative of directional input commands which exceed a further predetermined duration.

4. A monitor apparatus as claimed in claim 1 including fifth logic means coupling said second input providing means to said fourth logic means for producing an error signal at the output of said fourth logic means if the control apparatus produces servo directional control signals in opposed directions.

5. A monitor apparatus as claimed in claim 1 including further input means arranged to produce further inputs representative of no directional input commands to the control apparatus, representative of no servo directional control signals from the control apparatus and representative of no actuator response, the further inputs being fed to the first, second, and third logic means for positively monitoring the control apparatus and actuator response at all times even in the absence of input signals from said first, second and third input providing means.

6. A monitor apparatus as claimed in claim 5 wherein said further input means includes normally closed switches arranged for connecting the monitor apparatus to the control apparatus to be monitored.

7. A monitor apparatus as claimed in claim 6 wherein the further inputs are produced from within the monitor apparatus as a result of any one of the normally closed switches opening during use.

8. A monitor apparatus as claimed in claim 1, wherein:
   said first logic means includes means for sustaining actuation once enabled and means for resetting said first logic means.

9. A monitor apparatus as claimed in claim 8, wherein:
   said resetting means includes a monostable circuit.

10. A monitor apparatus as claimed in claim 1, wherein:
    said first logic means includes an EXCLUSIVE OR gate coupled to said fourth logic means.

11. A monitor apparatus as claimed in claim 1, including:
    a pair of isolating diodes coupled to said second input providing means and a NOR gate and a NAND gate for receiving the ouputs from said isolating diodes, each of said gates receiving input signals from both of said isolating diodes.

12. A monitor apparatus as claimed in claim 1, wherein:
    said third logic means include a pair of NOT EXCLUSIVE OR gates having their inputs coupled to said third input providng means and said first logic means, the outputs of said NOT EXCLUSIVE OR gates being coupled to said fourth logic means.

13. A monitor apparatus as claimed in claim 12, wherein:
    said fourth logic means includes a NAND gate to receive the outputs from said NOT EXCLUSIVE OR gates.

14. A monitor apparatus as claimed in claim 6, wherein:
    said first, second, and third input providing means include inverters for enabling said fourth logic means if one of said normally closed switches is opened.

15. A monitor apparatus as claimed in claim 1, wherein:
    said first logic circuit means includes a plurality of NOR gates coupled to said first input providing means and a NOT EXCLUSIVE OR gate coupled to said NOR gates.

16. A monitor apparatus as claimed in claim 1, wherein:
    said second logic means includes a NOT EXCLUSIVE OR gate coupled to said fourth logic means.

17. A monitor apparatus as claimed in claim 1, wherein:
    said third logic means includes a NOT EXCLUSIVE OR gate coupled to said fourth logic means.

* * * * *